Patented Nov. 11, 1930

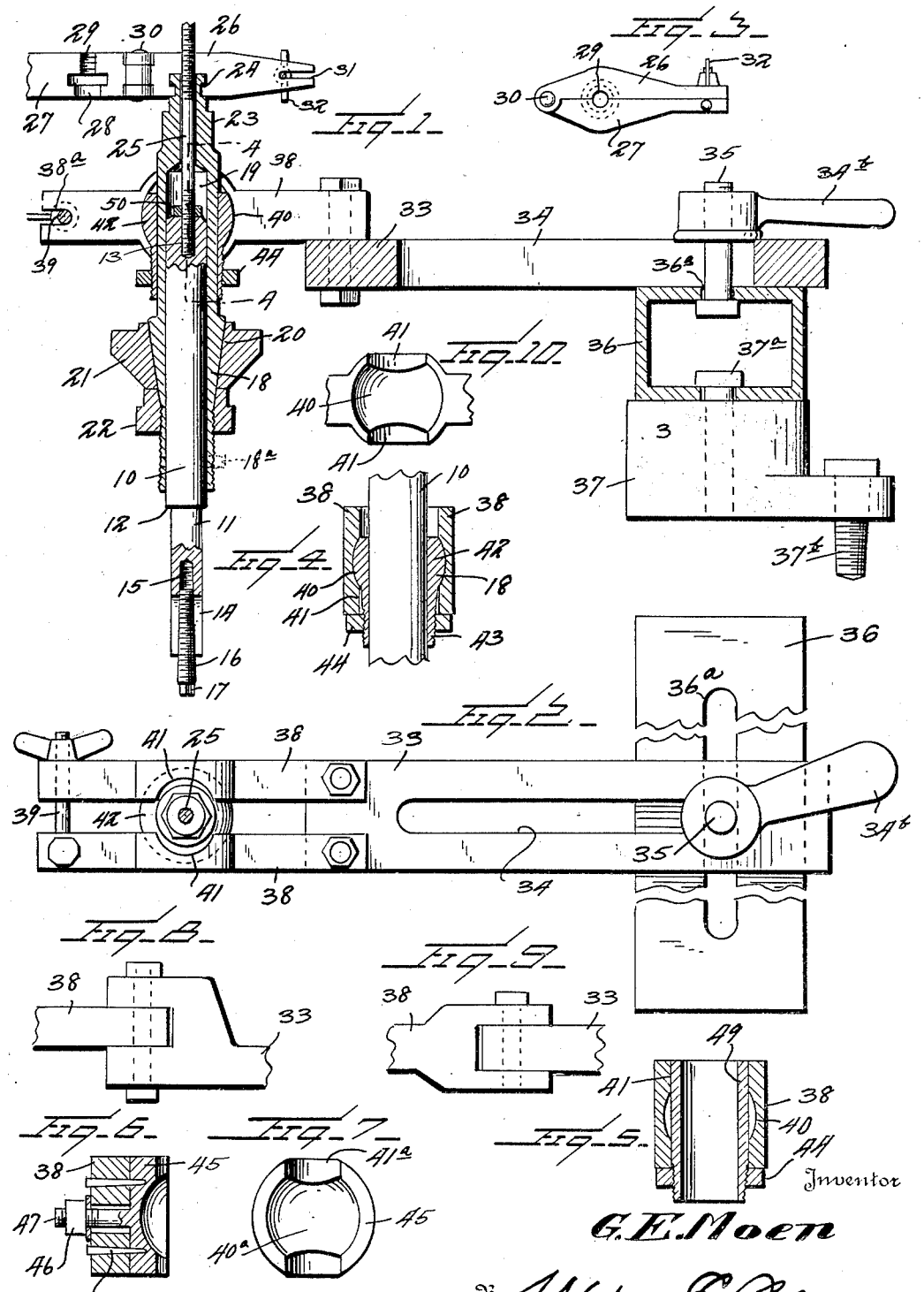

1,781,338

UNITED STATES PATENT OFFICE

GEORGE E. MOEN, OF KELSO, WASHINGTON

VALVE-REAMING TOOL

Application filed January 27, 1927. Serial No. 164,041.

This invention relates to boring or reaming devices and particularly to a combination tool designed especially for the purpose of operating upon the valve seats, valves, and other allied parts of engines.

The general object of the invention is to provide a combination tool which may be readily mounted upon an engine block and by which ports may be bored, valve stem guides reamed, valve seats trued up or narrowed, and in fact whereby a large range of work of this character may be accomplished.

Another object is to provide a tool of this character which is very simple, accurate, and relatively cheap, which may be quickly applied to the work upon which the tool operates, which will provide for supporting the tool carrying shank or stem both above and below the reamer if desired, which supporting means is self-aligning, thus eliminating any possibility of throwing the reamer or other tool out of alignment with the valve stem guide.

A further object is to provide means whereby the tool may be positively fed, thus permitting the use of dull reamers or operating upon hard seats.

Still another object is to provide a combination tool of this character in which the tools may be readily changed for boring, reaming, narrowing or facing off a valve seat, etc., and which may be used with ordinary jigs if desired.

Another object is to so construct the tool that the stem of the cutting tool may be adjusted into angular relation to the work.

A still further object is to provide a tool of this character with means whereby the support for the tool need not be changed from its adjusted position in order to change the cutter or other implement of the tool.

Still another object is to provide a pilot shank with means whereby it may be clamped in engagement with a valve stem guide to thus hold the reaming tool in proper alignment.

My invention is illustrated in the accompanying drawings wherein:—

Figure 1 is a vertical sectional view of a valve seat reamer and its support constructed in accordance with my invention;

Fig. 2 is a top plan view of the construction illustrated in Figure 1, the feed screw being in section;

Fig. 3 is a top plan view of the feed nut;

Fig. 4 is an enlarged fragmentary vertical section through the spindle or shank and the jaws of the supporting arms on the line 4—4 of Figure 1.

Fig. 5 is a fragmentary vertical sectional view through the spindle and the jaws on the same line as Figure 4, the ball being omitted and a sleeve being substituted;

Fig. 6 is a fragmentary sectional view through one of the jaws and showing a modified form of socket;

Fig. 7 is an elevation of the socket;

Figures 8 and 9 are fragmentary elevations showing modifications of the joints between the supporting arms and the jaws;

Fig. 10 is a fragmentary face view of one of the jaws.

Referring to these drawings 10 designates what I term the pilot shank or spindle. This shank is cylindrical in form and the lower portion of the shank is reduced in diameter as at 11, providing a shoulder 12. The upper portion of the shank is formed with a screw-threaded bore 13. This bore, as hereinafter explained, may extend entirely through the shank. The lower end of the shank is longitudinally split, as at 14, and formed with a tapered screw-threaded bore 15, within which fits the tapered plug 16 having a many sided head 17 at its lower end. The pilot shank 10 fits within a reamer carrier 18 formed as a sleeve for a portion of its length to provide a longitudinally extending bore 19 within which the shank 10 fits, the reamer carrier being rotatable upon this shank. The reamer carrier is formed with a tapered seat 20 upon which the reamer 21 may be mounted and held in place by any suitable means as, for instance, by the nut 22. Above the upper end of the bore 19 the reamer carrier is formed with a many sided head 23 and above this with a cylindrical portion having a circumferential groove 24.

Extending downward through the upper end of the reamer carrier is a feed bolt or screw 25. This has screw-threaded engagement in the bore 13 and also has screw-threaded engagement at its upper end in the split feed nut formed of the two sections 26 and 27. Each of these sections has a projecting portion 28 engaging in the circumferential groove 24 and above this is provided with the screw-threaded bore 29. The like extremities of these two jaws are pivoted to each other by a pin or bolt 30 and at the opposite ends these jaws may be provided with means for clamping them together. Thus, for instance, the jaws may be longitudinally slotted and a bolt 31 may be pivoted in one slot and engage through the other slot, this bolt having the wing nut 32. Obviously when these jaws are brought together and clamped, they will have screw-threaded engagement with the bolt or screw 25 and rotative engagement with the upper end of the carrier 18 and as this nut formed by the jaws is rotated, it will move upward or downward upon the screw 25 and shift the reamer carrier upward or downward with relation to the pilot shank 10.

Under some circumstances it is desirable to provide a supporting bracket for the reamer carrier and I have illustrated a bracket 33 or supporting arm which is longitudinally slotted, as at 34. A bolt 35 extends through this slot and through a longitudinally extending slot 36$^a$ formed in a longitudinally extending base 36. This base 36, as illustrated, is bolted to a supporting block 37 by means of the bolt 37$^a$, which block is provided with a screw 37$^b$ for holding the block in place upon an engine block or upon the face of the work to be operated on. The bolt 35 carries the nut 34$^b$.

Bolted or otherwise attached to the extremity of the bracket 33 are two jaws 38 which are engaged with each other at their free ends by means of a tightening bolt 39, one end of which is pivoted to one of the jaws and the other end of which is adapted to enter a slot 38$^a$ in the other jaw. The middle portion of each jaw is formed with a concavity 40 and above and below this concavity with an arcuate recess 41. These recesses 41 have a curvature approximately concentric to the spindle 18.

Disposed within and engaged by the concavities 40 is the ball 42 which has a central aperture through which the shank or spindle 10 passes. The upper end of the ball is truncated but the lower end is extended downward or prolonged as at 43, and exteriorly screw-threaded for the reception of the nut 44. The concavities 40 constitute a socket for the ball 42 and obviously the ball may be rotated or oscillated in this socket to bring the reamer carrier 18 with the shank 10 or spindle into any desired angular relation to the supporting bracket 33 and then the ball may be clamped in this adjusted position by the bolt 39. If it be desired to hold the reamer carrier 18 and the stem or shank 10 rigidly in place at right angles to the bracket 33 for certain classes of work, the ball 42 may be removed entirely and the reamer carrier will then engage within the recesses 41 and obviously cannot move out of a position at right angles to the plane of the jaws. The prolongation 43 of the ball may be split or otherwise formed so that the nut 44 will clamp the ball firmly upon the reamer carrier 18 so that the ball and reamer carrier must oscillate together with no play.

While the ball sockets or seats 40 may be formed directly in the jaws, yet under some circumstances I provide auxiliary wear plates 45, see Figures 6 and 7, adapted to be disposed on the inside faces of the jaws 38 and held in place by a nut 46 on the stud bolt 47 and held from rotation by pins 48. These wear plates are also provided with seats 41$^a$ as well as with the sockets 40$^a$ so that the ball may be removed and the reamer carrier held firmly in these seats 41$^a$ and at all times at right angles to the plane of the jaws and from any movement out of this plane. In Figure 5 I have illustrated the manner in which the reamer carrier may be mounted within a sleeve 49 so as to be held at all times at exactly right angles to the plane of the bracket 33. Thus, in place of having the reamer carrier 18 itself fit in the recesses 41 or 41$^a$ I may, as shown in Figure 5, provide a sleeve 49 which takes the place of the ball 42 and which is screw-threaded at its lower end for engagement by the nut 44 and which may be thus clamped snugly upon the reamer carrier. Of course, it will be understood that the reamer carrier must be free to rotate within the jaws and, therefore, the nut 44 either when used with the ball 42 or with the sleeve 49 should not be so tightly clamped as to prevent rotation of the reamer carrier.

While in Figure 1 I have illustrated the jaws as being mounted at their rear ends upon the upper face of the arm or bracket 33, I do not wish to be limited to this. The bracket 33 may be bifurcated at its forward end, as shown in Figure 8, to receive the jaws 38 or each jaw may be bifurcated, as shown in Figure 9, to receive the bracket 33.

In many cases it will not be necessary to use the feed nut 26 and the feed nut may then be entirely removed but under some circumstances the feed nut is necessary as, for instance, where a valve seat is very hard or the reamer old and dull.

In the operation of this device, the lower end of the stem or shank 10 is passed through the valve stem guide and thus is held in proper axial relation to the valve seat to be reamed. The reamer 21 is placed upon the carrier and the carrier inserted upon the stem 10 with the feed screw passing through the carrier. The clamping nut 26 is then closed upon the screw 25, if a positive feed is required. It will, of course, be understood that by rotating the plug 16 relative to the shank 10, the plug may be forced up into the bore 15, thus expanding the lower end of the pilot shank and holding it in clamping engagement with the valve stem guide. If necessary, the supporting bracket 33 may be used in order to hold the reamer carrier in its proper set position. By providing the bracket and reamer carrier with a ball and socket connection, the top supporting bracket will be self-aligning and non-binding.

Particular attention is called to the fact that the provision of the jaws 38 permits the reamer carrier and the pilot shank to be removed from their operative engagement with the bracket 33 without in any way changing the adjustment of the bracket 33, the base 36, or the block 37, if the latter is used, and without requiring that more than one of the jaws 38 be shifted to open the jaws. Thus, one of the jaws may be released and shifted to fully open position, the reamer carrier with its attendant parts removed, a new tool or different tool inserted, and then the reamer carrier and allied parts may be returned exactly to the position in which they were, thus doing away with the necessity of readjusting the mechanism each time that a change is made in a tool. This is a very important feature of this invention as it eliminates the time lost in readjustment and renders the replacement of the tool in exactly the same spot absolutely certain. Furthermore, by pivoting the jaws upon the bracket 33 it is possible to get them out of the way when changing reamers. The provision of the jaws 38 secures a device for the purpose described which may be used more quickly and more cheaply for all kinds of valve work than any other form of reamer known to me, as all reamers may be changed without changing the supporting bracket 33 and this is particularly necessary as on one valve there are seven different changes and seven different reamers to be used. Thus, there is an adjustment or change for reaming, for the valve stem guide, one for 45° reamers, one for a 75° reamer, one for a 15° reamer, one for reaming a hole for an oversize valve head, and one for engaging a valve seat and without the provision of these jaws 38, it would be necessary to readjust the bracket 33 seven different times.

The straight holder, that is, the reamer carrier used without the ball 42, is used when valve stem guides are reamed. If valve seats are worked on, however, it is necessary to use the ball as in many cases the guide is not true or straight with the head and the flexibility given by the ball takes care of this. Again in some engines the valve seat and valve stem guide are at an angle to the head or block and then, of course, the ball type of holder must be used. The ball type of holder as illustrated in Figure 1, may, of course, be made to do work which is exactly at right angles to the face of the engine block or head but not with the absolute accuracy which is secured where the ball is removed and the reamer holder is disposed always exactly at right angles with the plane of the bracket 33.

It is desirable to provide a plurality of shanks or spindles 10 with reduced portions 11 of different sizes so that if the holes vary, one or the other of the shanks would fit. The better the fit of the portion 11 within the guide hole, the surer one is of getting the reamer holder 18 straight in line. The plug 16 is tightened so as to secure a proper fit. It is furthermore necessary to provide the plug 16 particularly if the work is hard or the reamer dull so that the feed mechanism may be used which, of course, exerts an upward pull upon the member 10.

It will be seen that this tool is particularly simple and accurate and that it may be quickly applied to a job. On most work only the parts 10, 16 and 18 need be used. By my construction a support is provided both above and below the reamer, this support being self-aligning, eliminating any possibility of throwing the reamer out of alignment with the valve stem guide. This tool is adapted for use in reaming a valve stem guide in an oversize valve stem. If the valve seats are too wide they can be narrowed. If they are in bad shape, the seats can be reamed and new valve seats put in. This tool may operate on any part of the valve seat or guide or valve stem guide, or on the exhaust ports or intake ports so as to grind them flat or oversize as desired. I have provided a positive feed for hard seats or dull reamers if required. Of course, the reamer carrier 18 is to be operated by means of a wrench or like device applied to the portion 23.

It will be noted that the reamer holder 18 may either be straight or tapered to carry either straight or tapered reamers. I have illustrated a tapered reamer and a tapered seat 20 on the reamer holder but I do not wish to be limited to this. Where the reamer is to be used in working on valve guides, the reamer is of a long type similar to a drill and would have a straight round shank which would be disposed within the carrier 18 in place of the shank 10. This reamer or drill, substituted for the shank 10, would be held in place in carrier 18 by means of the pin shown in dotted lines in Figure 1 and designated 18$^a$ passing through the lower threaded extension 18 and through the stem of the reamer or drill. It will thus be seen that this construction is adapted either to carry a reamer of the character shown in Figure 1 or a long reamer or drill.

I claim:—

1. An implement of the character described including a supporting arm having two opposed jaws hinged thereto having seats, the jaws being movable toward or from each other, means for adjusting the jaws and holding them in adjusted positions, a sleeve disposed within the seats, and a tool carrier rotatably disposed within said sleeve.

2. An implement of the character described including a supporting arm, and opposed, relatively movable jaws hinged to the arm, each formed with a concave socket, a tool carrier having a ball engaging in said sockets, and means for adjusting the jaws towards or from each other.

3. An implement of the character described including a supporting arm, opposed, relatively movable jaws each hingedly mounted thereon, the jaws having confronting concave sockets, the walls of each socket being formed with aligned arcuate seats, an annular ball disposed between the sockets, and a tool carrier extending through and mounted for rotation within the annular ball.

4. An implement of the character described including a supporting arm, opposed, relatively movable jaws hinged thereto, the jaws having confronting concave sockets, the wall of each socket having aligned arcuate seats, a ball disposed in said sockets and annular in cross section, a tool carrier extending through the ball and being rotatable therein, the upper end of the tool carrier having means whereby it may be rotated, and a sleeve through which the tool carrier may be disposed, said sleeve being adapted to fit said seats.

5. An implement of the character described including a supporting arm, opposed, relatively movable jaws each pivotally mounted thereon, the jaws having confronting concave sockets, the wall of each socket having aligned arcuate openings, a ball disposed within the sockets and annular in cross section, the ball having an extension beyond the sockets, a clamping nut engaging the extension, and a cylindrical tool carrier disposed through the ball and rotatable therein.

6. In an implement of the character described, a base having a longitudinal slot, means for clamping the base to the work and adjusting it thereon, a bracket longitudinally adjustable upon the base, opposed, relatively movable jaws hingedly mounted on the bracket, and a tool holder rotatably carried between said jaws, the jaws having means whereby they may be drawn towards each other and against the tool carrier or whereby they may be opened to release the tool carrier.

7. In an implement of the character described, a base adapted to be clamped upon the work, a bracket adjustably mounted upon the base, and opposed jaws mounted upon the bracket, one of said jaws being pivoted for movement toward or from the other jaw, means for drawing said jaws towards each other or permitting them to be relatively opened, and a tool carrier rotatably mounted between the jaws.

8. In an implement of the character described, a base adapted to be clamped upon the work, a bracket adjustably mounted upon the base, and opposed jaws each pivotally mounted upon the bracket and being movable toward or away from each other, means engaging the free ends of the jaws for drawing them towards each other, said means permitting the jaws to be opened out, and a tool holder rotatably carried between said jaws.

9. A tool of the character described including a supporting arm, a member mounted on the arm and angularly adjustable thereon, a reamer carrier extending through said member and longitudinally slidable therethrough, a supporting member slidably mounted within the reamer carrier and extending beyond the same and having means whereby it may be engaged with a valve stem guide and clamped within the guide against longitudinal movement, and means operatively engaging said supporting member and the reamer carrier for causing a positive feed of the reamer carrier with reference to the supporting member, and the supporting arm in either direction.

10. A tool of the character described including a tubular reamer carrier, a supporting shank disposed therein for longitudinal movement therethrough and projecting below the lower end of the reamer carrier, means at the lower end of said shank whereby it may be engaged with a valve stem guide and held from longitudinal movement, a screw extending upward from the shank and passing loosely through the reamer carrier, and a nut having swiveled engagement with the upper end of the reamer carrier and screw-threaded engagement with said screw.

11. A tool of the character described including a tubular reamer carrier, a pilot shank disposed within the reamer carrier and projecting below its lower end, the lower end of the shank having means whereby it may be engaged with and clamped within a valve stem guide, the upper end of the pilot shank carrying a screw-threaded portion extending loosely through the upper end of the reamer carrier, a supporting arm through which the reamer carrier may slide and a two-part nut each part having swiveled engagement with the upper end of the reamer carrier and threaded engagement with said screw-threaded portion.

12. A tool of the character described including a supporting arm, a cylindrical tubular reamer carrier mounted in said arm for longitudinal movement therethrough at right angles to the arm, a pilot shank disposed within the reamer carrier and extending below the lower end thereof, the pilot shank having means at its lower end whereby it may be engaged with a valve stem guide, a screw-threaded member extending upward from the upper end of the pilot shank and passing loosely through the upper end of the reamer carrier, a feed nut having swiveled engagement with the reamer carrier and threaded engagement with the screw-threaded member, said supporting arm being formed in two sections hinged for movement toward or away from each other, and clamping the reamer carrier when the sections are forced toward the reamer carrier, means for adjusting the sections toward each other, and means for supporting said arm.

13. An implement of the character described including an arm having opposed relatively movable jaws hinged to the arm whereby said jaws may be shifted into an angular relation to each other which will permit the insert or removal of a tool carrier laterally between the jaws and said jaws having confronting seats, a tool carrier rotatably disposed between the jaws and in said seats, means for shifting the tool carrier axially within the seats, and means for relatively adjusting the jaws toward or from each other, said means being releasable from one of said jaws to permit the jaws to be swung into a fully opened position.

In testimony whereof I hereunto affix my signature.

GEORGE E. MOEN.